United States Patent
Krot et al.

[11] Patent Number: 5,640,668
[45] Date of Patent: Jun. 17, 1997

[54] REMOVAL OF DISSOLVED ACTINIDES FROM ALKALINE SOLUTIONS BY THE METHOD OF APPEARING REAGENTS

[76] Inventors: Nikolai N. Krot, Chelomiya St., 2, Apartment 15, Moscow, Russian Federation, 117630; Iraida A. Charushnikova, Svoboda St., Bldg. 7A, Apartment 15, Moscow, Russian Federation, 123362

[21] Appl. No.: 618,922

[22] Filed: Mar. 20, 1996

[51] Int. Cl.⁶ .................. C01G 43/01; C01G 56/00
[52] U.S. Cl. .................. 423/12; 423/250; 423/251; 588/20
[58] Field of Search .................. 423/11, 12, 250, 423/251; 588/20

[56] References Cited

U.S. PATENT DOCUMENTS

| | | | |
|---|---|---|---|
| 2,768,871 | 10/1956 | Brown et al. | 423/251 |
| 2,838,366 | 6/1958 | Beaufait | 423/251 |
| 2,838,371 | 6/1958 | Watt et al. | 423/251 |
| 2,851,333 | 9/1958 | Brown et al. | 423/12 |
| 2,860,948 | 11/1958 | Fried | 423/251 |
| 2,996,352 | 8/1961 | Barrick et al. | 423/251 |
| 3,372,999 | 3/1968 | Stevenson | 423/12 |
| 4,156,646 | 5/1979 | Schulz | 423/12 |
| 4,265,861 | 5/1981 | Cleary et al. | 423/11 |
| 4,269,706 | 5/1981 | Sondermann | 423/12 |
| 4,432,893 | 2/1984 | Lee et al. | 423/12 |
| 4,565,672 | 1/1986 | Schneider et al. | 423/251 |
| 4,591,488 | 5/1986 | Heckmann et al. | 423/251 |
| 4,759,878 | 7/1988 | Heinrich et al. | 423/251 |
| 4,800,024 | 1/1989 | Elfine | 423/12 |

*Primary Examiner*—Edward A. Miller
*Attorney, Agent, or Firm*—Bradley W. Smith; Mark P. Dvorscak; William R. Moser

[57] ABSTRACT

A method of reducing the concentration of neptunium and plutonium from alkaline radwastes containing plutonium and neptunium values along with other transuranic values produced during the course of plutonium production. The $OH^-$ concentration of the alkaline radwaste is adjusted to between about 0.1M and about 4M. $[UO_2(O_2)_3]^{4-}$ ion is added to the radwastes in the presence of catalytic amounts of $Cu^{+2}$, $Co^{+2}$ or $Fe^{+2}$ with heating to a temperature in excess of about 60° C. or 85° C., depending on the catalyst, to coprecipitate plutonium and neptunium from the radwaste. Thereafter, the coprecipitate is separated from the alkaline radwaste.

16 Claims, 2 Drawing Sheets

5,640,668

REMOVAL OF DISSOLVED ACTINIDES FROM ALKALINE SOLUTIONS BY THE METHOD OF APPEARING REAGENTS

CONTRACTUAL ORIGIN OF THE INVENTION

The United States Government has rights in this invention pursuant to the Peaceful Uses of Atomic Energy Agreement and the Memorandum of Understanding between the United States Department of Energy and the Russian Federation of Atomic Energy for Cooperative Research on Waste Management and Environmental Remediation.

BACKGROUND OF THE INVENTION

Decontamination and treatment of radwastes, accumulated in the course of industrial production of military plutonium in the United States as well as in Russia, is an important subject of investigation and research. Processing and disposal of Hanford Site high-level waste (HLW), containing about 329,000 tons of alkaline solutions, salt cakes and sludges with considerable quantities of hazardous long-lived plutonium, neptunium and americium isotopes, is part of the problem. The chemical composition of the Hanford Site wastes is complex and varies greatly from one tank to another.

It is recognized that most of the transuranium radionuclides likely will report to the solid phase following processing of Hanford HLW. However, even small quantities of these radionuclides remaining in the product supernate solutions may be enough that the alkaline solutions cannot be classified as low-level wastes (LLW). Additional purification of alkaline solutions from transuranium elements (TUE) likely will be required. Special methods, based on the coprecipitation of TUE with convenient carriers, is a probable solution to this problem. It is expected that the precipitates obtained by coprecipitation will be suitable for vitrification or for other subsequent treatments to isolate the TUE.

Coprecipitation of TUE with various carriers has been the subject of numerous investigations and is widely used in analytical practice, as part of certain radiochemical technologies, and as a treatment method in ecological settings. Metal hydroxides are potential carriers to purify alkaline solutions of TUE. Certain types of compounds having low solubility at high hydroxide (OH⁻) concentrations can be used for the coprecipitation. However, application of these carriers in the ordinary way (i.e., by the introduction of low acid or neutral aqueous solutions of the compound directly into the alkaline medium) is complicated by the rapid formation of the precipitate at the boundary surface between the mixed liquids. As a result, TUE isolation occurs mainly by adsorption on the surface of freshly formed precipitates and the effectiveness of TUE capture is low.

Compounds which are soluble in alkaline solution, but which can be readily precipitated by hydrolysis or redox reactions, avoid these difficulties. Such an approach (named the Method of Appearing Reagents—MAR) should accomplish uniform formation of the precipitate throughout the entire solution volume and provide more effective capture of TUE by the precipitating solid phase.

Objects of the Invention

An object of the invention is to provide a method for the coprecipitation of Np and Pu from HLW.

Another object of the invention is to provide a method for the coprecipitation of Np and Pu from HLW using the method of appearing reagents (MAR).

Yet another object of the invention is to provide a method for the coprecipitation of Np and Pu with uranyl ions and a Cu catalyst. Other possible, but less effective catalysts are $Co^{+2}$, $Fe^{+2}$ and $Fe^{+3}$.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

Figure 1:
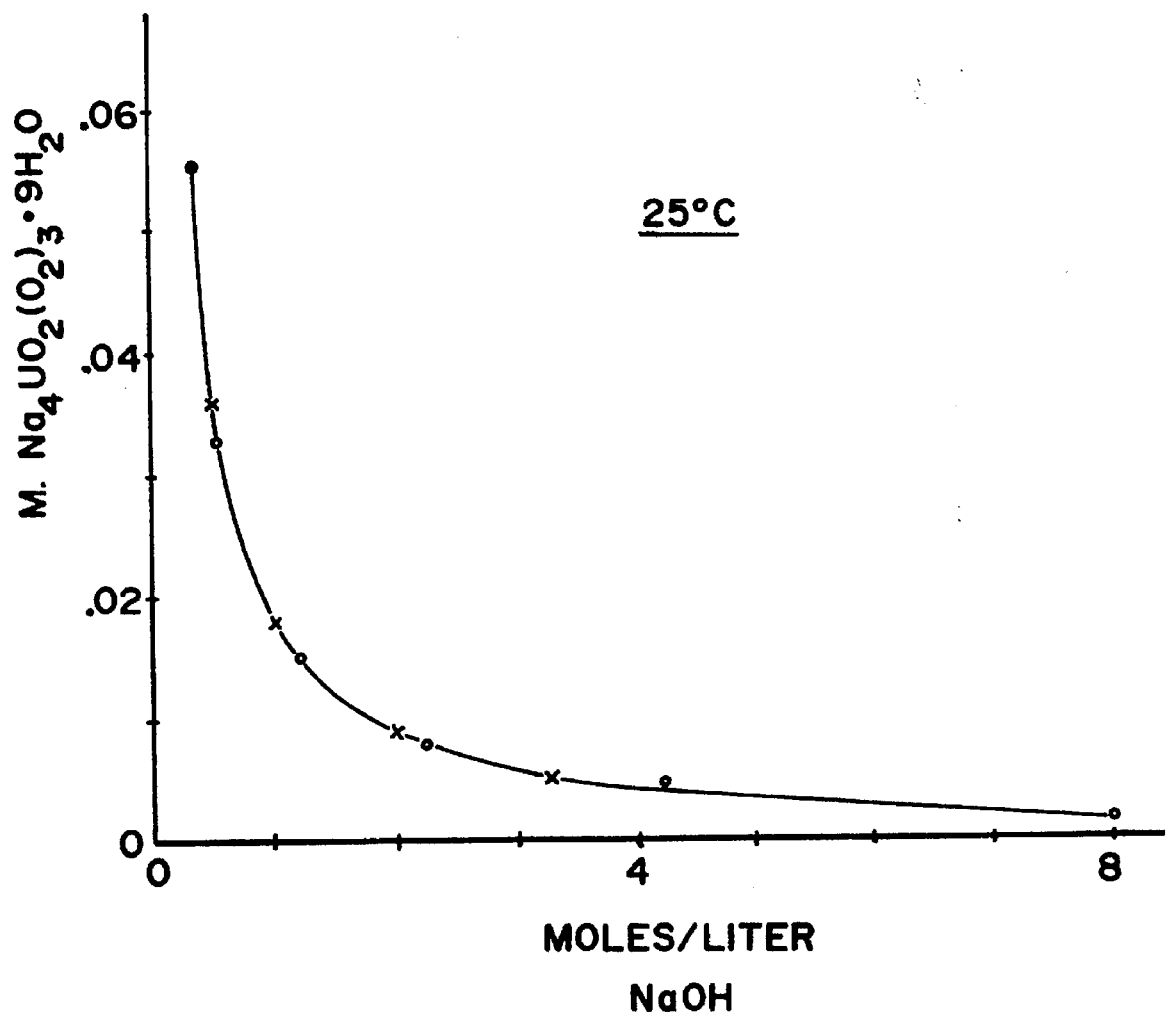
FIG. 1 is a graphical representation of the relationship between $Na_4UO_2(O_2)_3 \cdot 9H_2O$ and NaOH concentration at 25° C.

Standardized sodium hydroxide solutions (0.5 to 14.0M) were used in the experiments. The solutions were prepared by the dilution of 17.7M NaOH (p.a. or pro analysis grade) with distilled water, which had previously been acidified to pH 3 to 4 by $HNO_3$ and boiled to remove dissolved $CO_2$. The alkaline solutions were kept in closed polyethylene flasks. Potassium ferrate (VI) was prepared by the chlorine oxidation of $FeCl_3$ in concentrated alkali. Only fresh prepared $K_2FeO_4$ solutions, obtained by the dissolution of calculated quantities of the compound in 4M NaOH, were used.

Initial solutions of potassium peroxouranate were obtained by the reaction:

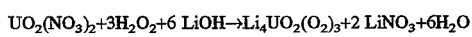

$$UO_2(NO_3)_2 + 3H_2O_2 + 6\,LiOH \rightarrow Li_4UO_2(O_2)_3 + 2\,LiNO_3 + 6H_2O$$

To obtain the potassium preoxouranate, excess hydrogen peroxide was added to a measured volume of titrated uranyl nitrate solution at the molar ratio $U:H_2O_2$ of 1:3.2. The precipitate was dissolved in LiOH solution. The concentrations of uranium and free alkali in the final solution were 0.4 and 0.1M, respectively.

To obtain 1M $UCl_4$ solutions, electrolysis of 1M uranyl chloride solution was carried out on a mercury-pool cathode in an electrochemical cell with separated cathode/anode compartments. Uranium (IV) concentrations in the product solutions were determined by complexometric titration in 0.02M HCl using xylenol orange as an indicator. Other solutions of reagents used in the work were prepared from reagent chemical compounds and distilled water.

All experiments were conducted in centrifuge test tubes made of glass or polyethylene (in the case of hot alkaline solutions). Medical centrifuges (model CLK-1, 36 cm diameter, 3000 revolutions/minute, separation factor 1750) were used to separate precipitates from supernatant solutions. Constant solution temperatures (within 0.2° C.) were maintained by a thermostat (model U-5, Germany). Absorption spectra were recorded using SFD-2 (Russia) or UV-3101PC (Shimadzu Instruments, Japan) spectrophotometers. Powder X-ray diffraction patterns were obtained by a 100 mm Guinier camera, model XDC-700, using $CuK_{\alpha1}$-radiation (X-ray Generator PW 1140/90/96, Philips, Holland).

Initial compounds which may be used for the coprecipitation of TUE by MAR from alkaline solutions must meet a number of requirements. These are:

Moderate solubility in water and in NaOH solutions up to 14M concentration

Stability in alkaline media sufficient for their uniform distribution throughout the whole volume of the solution phase Potential to reactions that form insoluble precipitates to capture TUE contaminants Fire and explosion safety and low toxicity for radiochemical plant application Ready availability and low expense on an industrial scale.

With the above criteria, a study of numerous literature data was undertaken. The following compounds were chosen for further examination as precipitate precursors: $KMnO_4$, $K_2MnO_4$, $K_2FeO_4$, $Na_2[Fe(CN)_5NO] \cdot 2H_2O$, $K_2CrO_4$, $Cr(NO_3)_3 9H_2O$, $Cr(CH_3COO)_3$, $[Co(NH_3)_6]Cl_3$, $[Co(NH_3)_5Cl]Cl_2$, and $Li_4UO_2(O_2)_3$. The following precipitates, potential carriers for the TUE coprecipitation, may be obtained from the precursor compounds in alkaline solutions by MAR: manganese dioxide; hydroxides of Mn(II), Fe(III), Cr(III), Co(II); and sodium uranates. However, after extensive investigation, it was determined that only the uranyl ion in combination with a suitable catalyst such as $Cu^{+2}$, $Co^{+2}$ or $Fe^{+2}$ served adequately to coprecipitate both Pu and Np from highly alkaline solutions. $Cu^{+2}$ is the preferred catalyst which is effective at about 60° C. while $Co^{+2}$ and $Fe^{+2}$ can be used for peroxouranate decomposition, but required higher decomposition temperatures of about 85° C. Even then, however, certain limitations of the process pertain.

The compositions of uranyl peroxo complexes are quite varied. Data concerning their formation, structure, and properties have been collected and systematized. Of the available peroxouranates, compounds containing the $[UO_2(O_2)_3]^{4-}$ complex appear to be the most interesting for TUE coprecipitation by MAR. Such compounds are very stable in alkaline media.

In our experiments, it was found that (1 to 5)×$10^{-3}$M $[UO_2(O_2)_3]^{4-}$ solutions in 2, 4, and 8M NaOH do not undergo any marked decomposition with three hours' heating on a boiling water bath. Uranyl complexes with ratio $O^{2-}$:U less than three give precipitates at the transition from neutral aqueous to alkaline solution apparently due to their decomposition to $[UO_2(O_2)_3]^{4-}$ and uranates.

The sodium salt of triperoxouranate has low solubility in water and NaOH solutions (FIG. 1). Therefore, it is not useful as an initial reagent to introduce $[UO_2(O_2)_3]^{4-}$ into alkaline radwastes. The potassium salt, whose solubility in water is about 1.6M, is more promising, but it is not stable. Lithium peroxouranate is the most advantageous because it is both stable and freely soluble.

Solutions of $Li_4UO_2(O_2)_3$ solutions may be readily prepared by consecutive additions of excess $H_2O_2$ and LiOH to low acid solutions of uranyl nitrate. By this method, the initially formed uranium peroxide precipitate dissolves to give the bright orange $[UO_2(O_2)_3]^{4-}$ complex solution.

Due to the high thermal stability of $[UO_2(O_2)_3]^{4-}$, its precipitation as a uranate salt in alkaline solution by heating is impossible. However, preliminary experiments have shown that uranate precipitation can be attained using redox reagents or catalysts to decompose peroxide. For example, destruction of $[UO_2(O_2)_3]^{4-}$ and the precipitation of uranates can be initiated by the addition of permanganate or uranium (IV) to alkaline solutions. However, in the case of $MnO^-_4$, the uranate precipitate is contaminated by considerable quantities of manganese dioxide. If uranium (IV) is used to decompose $[UO_2(O_2)_3]^{4-}$, a large stoichiometric excess of reductant is required. Unfortunately, other reductants, including hydrazine and hydroxylamine, do not react with $[UO_2(O_2)_3]^{4-}$ even with extended heating. Therefore, catalysts to decompose peroxide are preferred over redox reagents to convert $[UO_2(O_2)_3]^{4-}$ to uranate precipitates.

Scoping studies showed salts of Co(II), Fe(II), Fe(III), and Cu(II) could be useful as catalysts. Based on scoping experiments, Cu(II) salts were selected as catalysts as they were effective at 60° C. The other catalysts required higher temperatures of about 85° C. to become effective. To determine optimum conditions for their use, further experiments were conducted. Aliquots of solutions (5 mL volume) with fixed NaOH and $[UO_2(O_2)_3]^{4-}$ concentrations were measured into centrifuge test tubes, kept in thermostats for 10 to 15 minutes at the chosen temperature, and timing begun upon addition of catalyst. The start of uranate precipitation was determined visually and test aliquots were taken periodically. After centrifugation, the test aliquots were analyzed spectrophotometrically for uranium using the arsenazo III chromophore. The experiment was finished when the uranium solution concentration became small and constant.

The experiments showed that the temperature, and the catalyst and the alkali concentrations, all affect the transformation of $[UO_2(O_2)_3]^{4-}$ to uranate. The optimum catalyst concentration was about 0.005M. Copper(II) remains completely soluble in solutions with greater than 6M NaOH. In more dilute alkaline solutions, copper (II) precipitation was observed.

Figure 2:
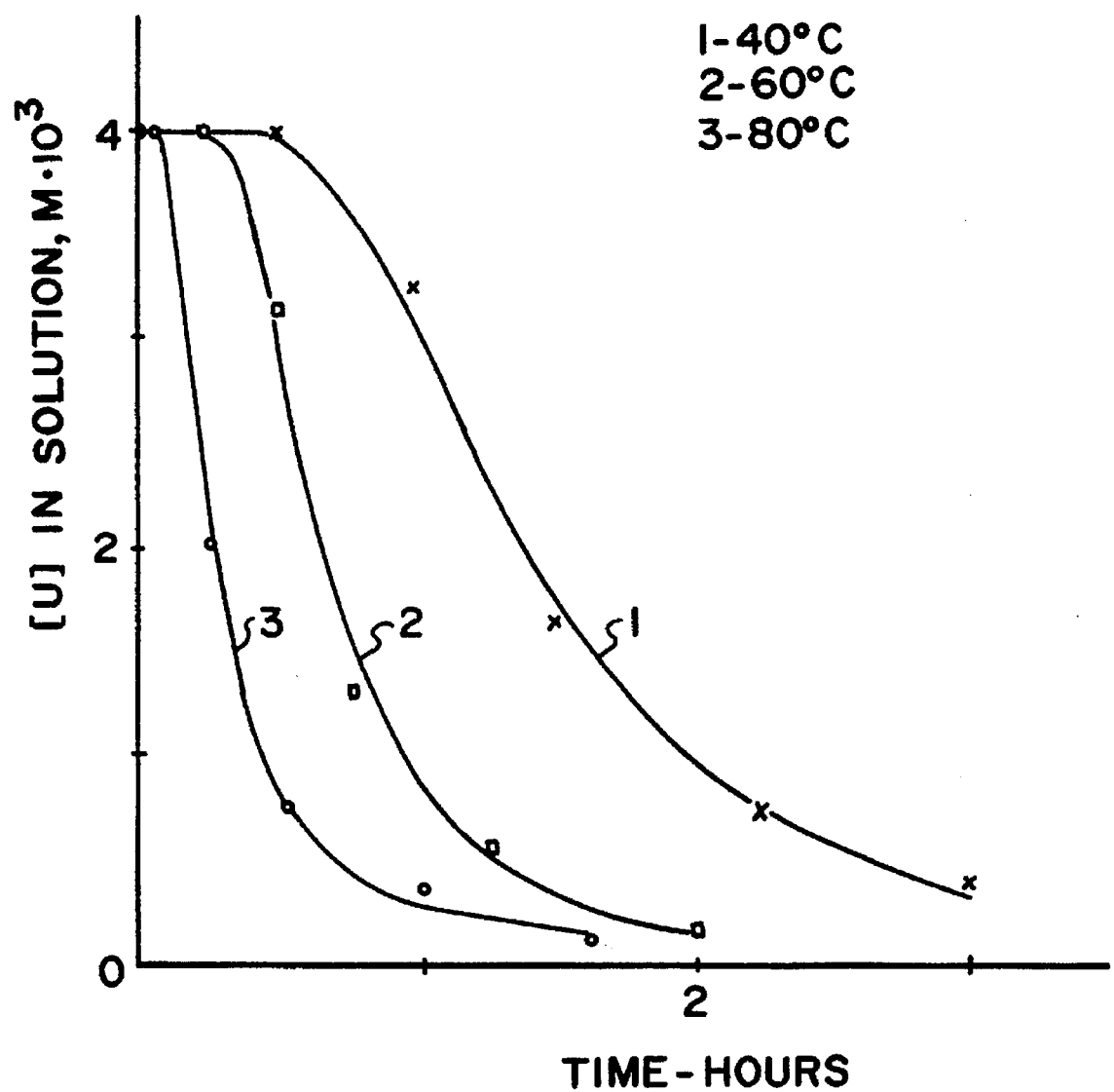
FIG. 2 is a graphical representation of the rate of Na uranate precipitation in alkaline solutions in the presence of $Cu^{+2}$ catalyst.

Uranate precipitation begins immediately upon catalyst addition to warm (60° C.) solutions at 0.5 to 0.8M NaOH. Increasing alkali concentration results in an induction period during which the solutions remain transparent. The duration of the induction period is 2, 8, 15, 20, and 30 minutes, respectively, for 2, 4, 6, 8 and 10M NaOH solutions [at 60° C. and 0.005M Cu(II)]. After the induction period, the uranium (VI) precipitation rate depends weakly on alkali concentration. Under the stated conditions, precipitation is complete in 30 minutes. Higher temperatures strongly decrease the induction period and increase the rate of sodium uranate precipitation (FIG. 2).

To obtain uranate precipitates from $[UO_2(O_2)_3]^{4-}$ alkaline solutions for TUE coprecipitation by MAR, the following conditions are recommended. First, $Li_4UO_2(O_2)_3$, to a final concentration of 0.005 to 0.01M, should be added to the initial solution having NaOH concentration not higher than 10M. After heating the solution to 55° to 65° C., copper (II) nitrate or sulfate is introduced to 5×$10^{-3}$ M concentration. The hot solution should be kept stirring about two to three hours, cooled to 25° C., and centrifuged or filtered to separate the solid phase.

Solutions of plutonium and neptunium in the (V) and (VI) oxidation states were required for the coprecipitation tests.

Plutonium solutions were prepared from an initial stock $^{239}$Pu(IV) nitrate solution purified by ion exchange. The Pu(IV) stock concentration was determined by gravimetry. To prepare the Pu(VI) stock, Pu(IV) stock, containing 0.25 to 0.5 μmoles of plutonium, was aliquoted and 0.5 mL of concentrated $HClO_4$ added. The acid solutions were evaporated by slow boiling to damp salts and the dry residue dissolved in 25 mL of twice-distilled water. The resulting low-acid (pH 4) solutions contained (1 to 2)×$10^{-4}$ M Pu(VI) concentrations and were used within three days. Radiolytic reduction of Pu(VI) was not detectible in this period.

Plutonium (V) solutions were prepared immediately before use by the addition of stoichiometric amounts of $H_2O_2$ or $N_2H_4$ to aliquots of low-acid Pu(VI) solutions.

Neptunium solutions were prepared from standard $^{237}$Np (V) nitrate solution purified by ion exchange. To prepare the Np(VI) stock, aliquots of Np(V) stock diluted in 2M $HNO_3$ were evaporated to damp salts; the dry residue then was dissolved in bidistilled water. The completeness of neptunium oxidation to the hexavalent state was checked by spectrophotometry as indicated by the absence of an absorption band at 981 nm.

To produce Np(V) solutions, Np(V) hydroxide first was precipitated by ammonia, in the presence of nitrite, from the stock acid nitrate solution. The resulting NpV) hydroxide precipitate then was thoroughly washed with water to the point of peptization. Neutral Np(V) solutions were obtained by dissolution of the freshly precipitated $NpO_2OH$ in a stoichiometric amount of dilute $HNO_3$ and volumetric dilution of the dissolved solids.

Radiometric counting devices were used to measure alpha and gamma activity quantitatively. The model "20026" device (produced by VEB RTF Messeelektronik "Ottoschon" of Dresden, Germany) was used to measure $\alpha$- and $\gamma$-activity. These measurements used a comparative technique in which corresponding neptunium- or plutonium-spiked standards were produced for measurement calibration. To determine $\alpha$-activity, a scintillation detector based on ZnS was used. To eliminate the influence of $^{233}Pa$ radiation, the $\gamma$activity of $^{237}Np$ was measured by a semiconductor intrinsic germanium detector (model DGDC-63; resolution 1.5 keV for 100 keV) with multichannel analyzer electronics (model AMO-03, Russian production). The errors of radiometric measurements were usually not higher than 10%.

The same general technique was used to investigate the coprecipitation of Pu(VI,V) and Np(VI,V) by the various candidate reagents. First, 5 mL of plutonium or neptunium solution of the desired valance were added to centrifuge test tubes. The tubes and contents were thermostatted for 10 to 15 minutes to reach the selected temperature. Then, 5 to 7 mL of prewarmed NaOH solution were added rapidly with stirring. The carrier precursor then was added to the spiked alkaline solution. The precipitating carrier was allowed to form by the respective hydrolysis, reduction, or catalytic decomposition reactions under the optimum conditions as identified in the previous section.

After precipitate coagulation, the test tube and contents were cooled to room temperature and centrifuged for 5 to 10 minutes. A 4 to 5 mL aliquot of mother solutions was then withdrawn for analysis. Centrifugation was resumed for a further 5 to 10 minutes and a second sample withdrawn for analysis. The coincidence of the two analytical results was taken as evidence of the complete separation of solution and solid phases. If the two results did not agree, the centrifugation (for a longer time) and analysis were repeated.

To determine plutonium concentrations, samples of the mother solution were acidified with concentrated $HNO_3$ to pH less than 3. Two to three 3 mg of lanthanum (as nitrate) were added to the acidified solution and $La(OH)_3$ precipitated by addition of ammonia. The precipitate was coagulated at room temperature for 10 to 20 minutes, centrifuged, washed 3 to 4 times with $0.1M$ $NH_4OH$ to removed entrained $NaNO_3$, and dissolved in 5 mL of 0.5 to 1M $HNO_3$. Quantitative 0.05 to 0.1 mL aliquots of the resulting solution were deposited onto counting planchets and, after drying and annealing, radiometric measurements were made. In parallel, the specific activities of the initial plutonium (VI) or (V) solutions were measured. The concentration data Were used to calculate the solution decontamination coefficient (DF), which was equal to the ratio of the specific activities of initial and mother solutions (following coprecipitation).

Neptunium concentrations in mother solutions were measured by their specific gamma activities in glass test tubes. Sample volumes were 2 to 4 mL. Neptunium concentrations in the initial alkaline solutions were also measured and decontamination coefficients calculated.

The optimum conditions for the isolation of sodium uranates from alkaline solutions of the uranyl peroxide complex ($[UO_2(O_2)_3]^{4-}$ were identified in the initial section of this report. These conditions are $0.005M$ Cu(II) catalyst concentration, 60° C. temperature, and 3 hours' heating time. The completeness of the coprecipitation of hexa- and pentavalent neptunium and plutonium as functions of the concentrations of carrier and alkali were studied using these conditions.

Results of the investigations, presented in Tables 1–4 show that the decontamination of alkaline solutions from Pu(VI) is, under comparable conditions, somewhat higher than from Np(VI). In both cases the decontamination decreases with increasing alkali concentration. The change from the hexa- to the pentavalent state of neptunium or plutonium has small influence on DF values. This similarity can be explained by the fact that during the addition of $Li_4UO_2(O_2)_3$, which contains excess $H_2O_2$, Np(VI) and Pu(VI) in alkaline solutions are rapidly reduced to their respective pentavalent states and form peroxo complexes. As a result, the neptunium and plutonium proceed to their same respective final oxidation states during the isolation of uranate precipitates irrespective of whether hexa- or pentavalent TUE were initially present in the alkaline solutions. It is also likely that during the decomposition of the peroxo complexes, Pu(V), in contrast with Np(V), partially reduces to the tetravalent state. Because of this, the DF values for plutonium are somewhat higher than those observed for neptunium.

TABLE 1

Decontamination of NaOH Solutions from Pu(VI) by Sodium Uranate Precipitation from the Catalytic Decomposition of $[UO_2(O_2)_3]^{4-}$ by $5 \times 10^{-3}$ M Cu(II). $[Pu(VI)]_0 = 5 \times 10^{-5}$ M.

| No. | [NaOH], M | $[[UO_2(O_2)_3]^{4-}]$, M | T, °C. | t,hours | DF |
|---|---|---|---|---|---|
| 1 | 0.5 | 0.01 | 60 | 3 | 610 |
| 2 | 1.0 | 0.01 | 60 | 3 | 860 |
| 3 | 2.0 | 0.01 | 60 | 3 | 320 |
| 4 | 4.0 | 0.01 | 60 | 3 | 170 |
| 5 | 6.0 | 0.01 | 60 | 3 | 60 |
| 6 | 8.0 | 0.01 | 60 | 3 | 30 |
| 7 | 4.0 | 0.002 | 60 | 3 | 25 |
| 8 | 4.0 | 0.004 | 60 | 3 | 80 |
| 9 | 4.0 | 0.008 | 60 | 3 | 330 |
| 10 | 4.0 | 0.012 | 60 | 3 | 410 |
| 11 | 4.0 | 0.016 | 60 | 3 | 450 |
| 12 | 4.0 | 0.020 | 60 | 3 | 500 |
| 13 | 4.0 | 0.01 | 60 | 1 | 150 |
| 14 | 4.0 | 0.01 | 60 | 4 | 120 |
| 15 | 4.0 | 0.01 | 70 | 3 | 110 |
| 16 | 4.0 | 0.01 | 50 | 3 | 140 |

TABLE 2

Decontamination of NaOH Solutions from Pu(V) by Sodium Uranate Precipitation from the Catalytic Decomposition of $[UO_2(O_2)_3]^{4-}$ by $5 \times 10^{-3}$ M Cu(II).
$[Pu(V)]_0 = 5 \times 10^{-5}$ M.

| No. | [NaOH], M | $[[UO_2(O_2)_3]^{4-}]$, M | Precipitation conditions T, °C. | t, hours | DF |
|---|---|---|---|---|---|
| 1 | 0.5 | 0.01 | 60 | 3 | 590 |
| 2 | 1.0 | 0.01 | 60 | 3 | 360 |
| 3 | 4.0 | 0.01 | 60 | 3 | 150 |
| 4 | 6.0 | 0.01 | 60 | 3 | 90 |
| 5 | 8.0 | 0.01 | 60 | 3 | 40 |
| 6 | 4.0 | 0.002 | 60 | 3 | 25 |
| 7 | 4.0 | 0.008 | 60 | 3 | 240 |
| 8 | 4.0 | 0.01 | 60 | 3 | 210 |
| 9 | 4.0 | 0.02 | 60 | 3 | 280 |
| 10 | 4.0 | 0.01 | 60 | 1 | 130 |
| 11 | 4.0 | 0.01 | 60 | 4 | 180 |

TABLE 3

Decontamination of NaOH Solutions from Np(VI) by Sodium Uranate Precipitation from the Catalytic Decomposition of $[UO_2(O_2)_3]^{4-}$ by $5 \times 10^{-3}$ M Cu(II).
$[Np(VI)]_0 = 2.5 \times 10^{-4}$ M.

| No. | [NaOH], M | $[[UO_2(O_2)_3]^{4-}]$, M | Precipitation conditions T, °C. | t, hours | DF |
|---|---|---|---|---|---|
| 1 | 0.5 | 0.02 | 60 | 3 | 230 |
| 2 | 1.0 | 0.02 | 60 | 3 | 160 |
| 3 | 2.0 | 0.02 | 60 | 3 | 110 |
| 4 | 4.0 | 0.02 | 60 | 3 | 80 |
| 5 | 6.0 | 0.02 | 60 | 3 | 16 |
| 6 | 8.0 | 0.02 | 60 | 3 | 10 |
| 7 | 4.0 | 0.008 | 60 | 3 | 8 |
| 8 | 4.0 | 0.012 | 60 | 3 | 25 |
| 9 | 4.0 | 0.016 | 60 | 3 | 40 |
| 10 | 4.0 | 0.022 | 60 | 3 | 85 |

TABLE 4

Decontamination of NaOH Solutions from Np(V) by Sodium Uranate Precipitation from the Catalytic Decomposition of $[UO_2(O_2)_3]^{4-}$ by $5 \times 10^{-3}$ M Cu(II).
$[Np(V)]_0 = 2.5 \times 10^{-4}$ M.

| No. | [NaOH], M | $[[UO_2(O_2)_3]^{4-}]$, M | Precipitation conditions T, °C. | t, hours | DF |
|---|---|---|---|---|---|
| 1 | 0.5 | 0.02 | 60 | 3 | 220 |
| 2 | 1.0 | 0.02 | 60 | 3 | 125 |
| 3 | 2.0 | 0.02 | 60 | 3 | 105 |
| 4 | 4.0 | 0.02 | 60 | 3 | 25 |
| 5 | 6.0 | 0.02 | 60 | 3 | 14 |
| 6 | 8.0 | 0.02 | 60 | 3 | 10 |
| 7 | 4.0 | 0.004 | 60 | 3 | 8 |
| 8 | 4.0 | 0.008 | 60 | 3 | 11 |
| 9 | 4.0 | 0.01 | 60 | 3 | 15 |
| 10 | 4.0 | 0.02 | 60 | 3 | 45 |

Independent of the initial oxidation state [(V) or (VI)], plutonium was found to coprecipitate well from 0.5 to 4M NaOH with all studied carriers such as $Fe^{+3}$, $Co^{+3}$, $Co^{+2}$ and $Mn^{+2}$ except manganese dioxide. The successful plutonium coprecipitation with these carriers is thought to be related to the reduction of plutonium to the poorly soluble tetravalent oxidation state in the course of these reactions.

In contrast, neptunium, present in the initial alkaline solutions in its penta- or hexavalent states, is captured weakly by all hydroxide precipitates, especially at high alkali concentrations. This behavior is thought to be due to the stabilization of neptunium as anionic hydroxo complexes in the alkaline media. These anionic complexes are assimilated poorly in the formed hydroxide carriers. A significant coprecipitation of Np(VI) or (V) with Pu, however, observed with sodium uranates in the presence of $Cu^{+2}$.

While there has been disclosed what is considered to be the preferred embodiment of the present invention it is understood that various changes in the details may be made without departing from the spirit or sacrificing any of the advantages of the present invention.

The embodiments of the invention in which an exclusive property or privilege is claimed are defined as follows:

1. A method of reducing the concentration of neptunium and plutonium from alkaline radwastes produced during the course of plutonium production, comprising adjusting the OH⁻ concentration to between about 0.1 and about 4M, and contacting the radwastes with alkali uranyl peroxide ion in the presence of catalytic amounts of a suitable catalyst to coprecipitate plutonium and neptunium from the radwaste.

2. The method of claim 1, wherein the OH⁻ concentration is adjusted to between about 0.1M and about 2M during contact of the radwaste with alkali uranate and the catalyst is $Cu^{+2}$.

3. The method of claim 2, wherein the uranyl peroxide ion is introduced as a Li salt.

4. The method of claim 3, wherein the coprecipitation is carried out at a temperature not less than about 60° C.

5. The method of claim 3, wherein the concentration of the uranyl peroxide ion is in the range of from about 0.1M to about 0.2M.

6. The method of claim 3, wherein the $Cu^{+2}$ concentration is about $5 \times 10^{-3}$M.

7. The method of claim 2, wherein the uranyl peroxide ion concentration is at least about 0.01 and the OH⁻ ion concentration is in the range of from about 0.5M to about 4M.

8. The method of claim 3, wherein the precipitation is carried out at a temperature not less than about 60° C., the uranyl peroxide ion concentration is not less than about 0.01M and the OH⁻ ion concentration is in the range of from about 0.5M to about 2M.

9. The method of claim 8, wherein the coprecipitate containing Pu and Np values is separated from the radwaste.

10. The method of claim 1, wherein the catalyst is one or more of $Cu^{+2}$, $Co^{+2}$ and $Fe^{+2}$.

11. The method of claim 10, wherein the catalyst is Co+2 or Fe+2 or mixtures thereof, the radwaste is heated to a temperature of not less than about 85° C. to coprecipitate plutonium and neptunium.

12. A method of reducing the concentration of neptunium and plutonium from alkaline radwastes containing plutonium and neptunium values along with other transuranic values produced during the course of plutonium production, comprising adjusting the OH⁻ concentration of the alkaline radwaste to between about 0.1M and about 2M, adding $[UO_2(O_2)_3]^{4-}$ ion to the radwastes in the presence of catalytic amounts of $Cu^{+2}$, heating to a temperature not less than about 60° C. to coprecipitate plutonium and neptunium from the radwaste, and thereafter separating the coprecipitate from the alkaline radwaste.

13. The method of claim 12, wherein the $[UO_2(O_2)_3]^{4-}$ ion is added as a lithium salt.

14. The method of claim 13, wherein the $OH^-$ is between about 0.5M and about 1M.

15. The method of claim 12, wherein the $OH^-$ concentration is maintained less than about 1M during the coprecipitation.

16. The method of claim 12, wherein the $Cu^{+2}$ concentration is about $5\times10^{-3}$M.

* * * * *